INVENTORS:
JAMES E. BLAKE,
ROMAN Z. ZAPUTOWYCZ,
BY Allen E. Angotti
THEIR ATTORNEY.

Aug. 15, 1967 J. E. BLAKE ETAL 3,336,440

SYSTEM FOR LOCKING AN OSCILLATOR TO A REFERENCE FREQUENCY HAVING A PARTICULAR SHAPED WAVEFORM TO FACILITATE SYNCHRONIZATION

Filed May 29, 1964 2 Sheets-Sheet 2

INVENTORS:
JAMES E. BLAKE,
ROMAN Z. ZAPUTOWYCZ,

BY [signature]

THEIR ATTORNEY.

United States Patent Office 3,336,440

Patented Aug. 15, 1967

3,336,440

SYSTEM FOR LOCKING AN OSCILLATOR TO A REFERENCE FREQUENCY HAVING A PARTICULAR SHAPED WAVEFORM TO FACILITATE SYNCHRONIZATION

James E. Blake, Elbridge, N.Y., and Roman Z. Zaputowycz, King of Prussia, Pa., assignors to General Electric Company, a corporation of New York Filed May 29, 1964, Ser. No. 371,209
8 Claims. (Cl. 178—69.5)

The present invention relates to a frequency locking system and more specifically to a system for locking the oscillator of a television synchronizing signal generator to a reference frequency.

Generally, in television systems employed in the United States, the basic vertical scanning frequency has been chosen at 60 cycles. Further, it has been common practice to control the basic frequency of a television system by locking the system to the 60 cycle power line frequency.

In television systems which are locked to the power line frequency, the output of the 31.5 kc. oscillator commonly employed in the synchronizing signal generator to provide interlaced scanning is connected to a 525:1 divider to provide a 60 cycle pulse output. The output of the divider is compared to the 60 cycle line frequency by a phase detector, the output of the phase detector being utilized to lock the frequency of the 31.5 kc. oscillator to the line frequency. In such a system, the gain of the feedback loop comprising the divider and the phase detector should be lower during small phase differences than during large phase differences in order to render the system insensitive to the short-term phase and frequency variations which are present on the power line. The gain of such a system is defined primarily by the slope of the reference wave shape. A sinusoidal reference wave has been employed in prior art systems. However, such systems are inherently incapable of providing optimum gain conditions during both large and small phase differences.

The present invention presents a system for locking an oscillator to a reference wave which insures optimum gain conditions.

Accordingly, an object of the present invention is to provide an improved system for locking an oscillator to a reference frequency.

Another object of the present invention is to provide an improved system for locking the oscillator of a television synchronizing signal generator to the power line frequency.

Still another object of the present invention is to provide a system for locking an oscillator to a reference signal having a wave shape which insures optimum gain conditions.

These and other objects are achieved in one embodiment of the invention by the provision of a nonsinusoidal reference wave at the line frequency which is compared to the 60 cycle pulse output of the 525:1 divider. The nonsinusoidal reference wave is half wave symmetrical and has a reduced slope portion in the region proximate to the point of symmetry and larger slope portion in the regions further removed from the point of symmetry. In one preferred embodiment of the present invention, the nonsinusoidal wave is realized by first shaping the sinusoidal power line waveform into a sawtooth wave, the sawtooth wave then being applied to a diode bridge having a breakdown diode in the center leg. A resistance is connected in shunt with the bridge to obtain the desired slope in the low loop gain region.

The novel and distinctive features of the invention are set forth in the appended claims. The invention itself, together with further objects and advantages thereof, may be best understood by reference to the following description and accompanying drawings in which:

Figure 1:
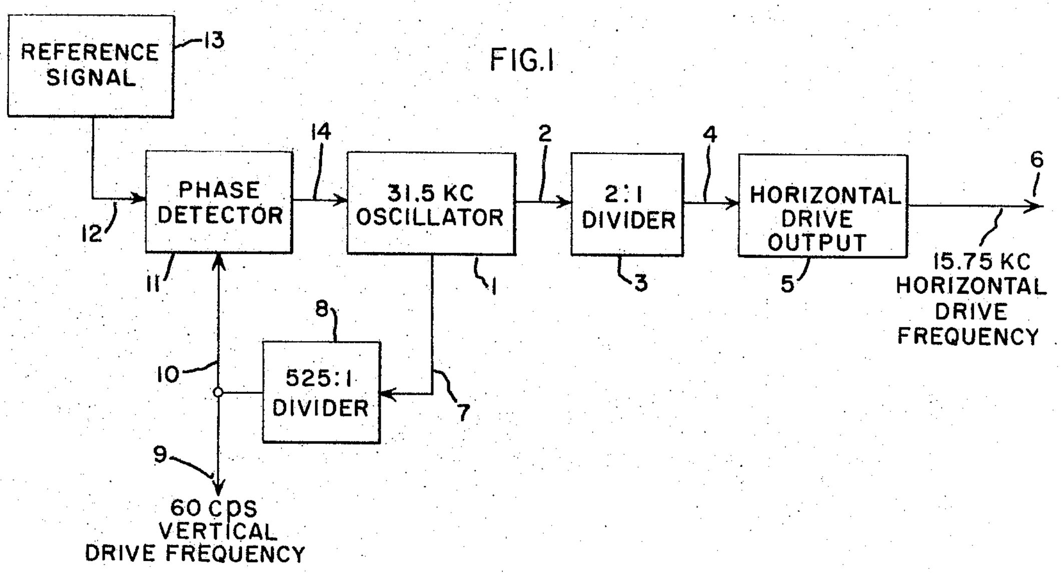
FIGURE 1 is a block diagram of a system for locking the oscillator of a television synchronizing signal generator to the power line frequency.

Referring to FIGURE 1, the synchronizing signal generator comprises a 31.5 kc. electrical frequency variable oscillator 1, the output of which is coupled through line 2 to a 2:1 divider 3. The output of the divider 3 is coupled through a line 4 to the horizontal drive output stage 5 to provide a 15.75 kc. horizontal synchronizing signal at the output terminal 6. The output of the 31.5 kc. oscillator 1 is also coupled through a line 7 to a 525:1 divider 8. Divider 8 provides a 60 cycle pulse output for vertical synchronizing at the output terminal 9.

The output of divider 8 is also coupled through line 10 to a phase detector 11. A nonsinusoidal reference signal at the line frequency is applied to the phase detector 11 through line 12 from reference signal source 13. The phase detector 11 develops an error signal which is proportional to the difference in phase between the reference signal on line 12 and the output of divider 8. The error signal is applied to the oscillator 1 through line 14 and serves to vary the frequency of the oscillator to a degree sufficient to lock the 31.5 kc. oscillator to the reference frequency.

In the system of FIGURE 1, assuming the reference signal to be maintained at the optimum 60 cycle frequency, a 31.5 kc. output is provided by the oscillator 1 and, thus, a 15.75 kc. horizontal synchronizing signal output and a 60 cycle vertical synchronizing signal output are realized at terminals 6 and 9, respectively. Should the line frequency vary from the optimum 60 cycle condition, a phase difference will exist between the reference frequency and the pulse output of the 525:1 divider 8, resulting in an error voltage being developed by the phase detector 11 and applied to the 31.5 kc. oscillator 1. The error voltage changes the frequency of the 31.5 kc. oscillator to a value which is 525 times the reference frequency so that the oscillator is again locked to the reference frequency.

For optimum operation in the system of FIGURE 1, the gain of the feedback loop comprising the divider 8 and phase detector 11 should be small for small phase differences in order to render the system insensitive to short-term phase and frequency disturbances which are inherently present on a power line. However, the gain of the feedback loop should be increased for large phase differences which represent long-term frequency changes of the reference signal to insure high "pull-in" and high "hold-in" of the system during the occurrence of such changes.

Figure 2:
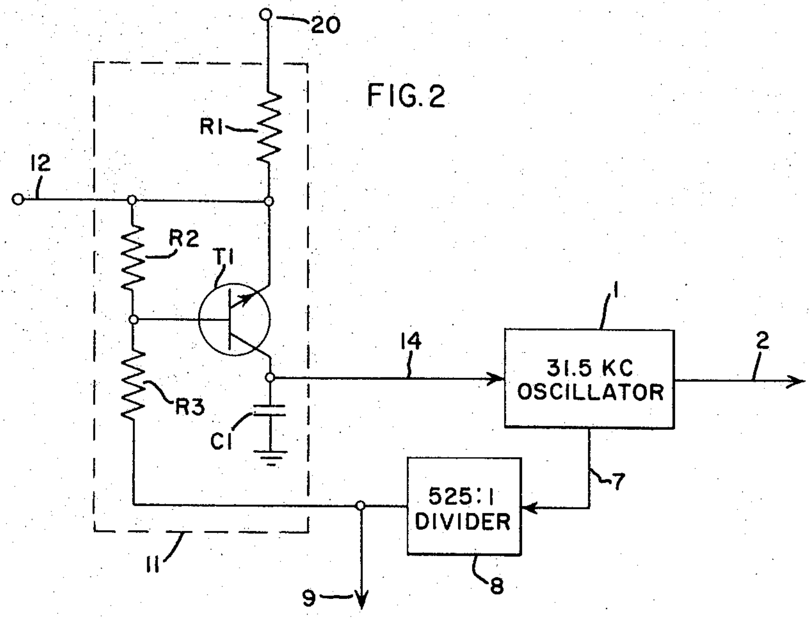
FIGURE 2 is a representative phase detector to be employed in the system of FIGURE 1.

Referring to FIGURE 2, there is shown in schematic form a representative phase detector to be employed in the system of FIGURE 1, like reference numerals being given to common elements. The phase detector 11 comprises a transistor T1 which is gated by the pulse output of the 525:1 divider 8 to charge a capacitor C1 connected between the collector electrode of the transistor and ground to a value defined by the instantaneous value of the reference signal to, thereby, develop an error signal. Resistor R1 is connected between the emitter electrode of the transistor T1 and terminal 20, a suitable voltage supply being connected between the terminal 20 and ground. Resistor R2 is connected between the emitter and the base electrodes of the transistor T1, the resistor R2 in conjunction with resistance R1 serving to properly bias the transistor. The reference signal is applied to the emitter electrode of transistor T1 via line 12. The output of the 525:1 divider 8 is connected through the resistance R3 to the base electrode of the transistor T1 to gate the transistor T1 on during the interval of each pulse.

The operation of the circuit of FIGURE 2 can be best appreciated by initially considering the reference signal to be at precisely 60 cycles and the output of the oscillator to be precisely 31.5 kc. In this condition the pulses from divider 8 are impressed on the base of the transistor T1 at the time that the reference signal is passing through zero. This condition exists when there is no relative phase difference between the reference signal and the output of divider 8. Thus, when the gating pulse appears at the base of the transistor T1 and the transistor conducts, the instantaneous voltage of the reference signal at the emitter of the transistor T1 is zero and does not affect the charge of the capacitor C1 so that no error signal is developed and the oscillator 1 remains at the same frequency.

Should the frequency of the reference signal change either above or below the optimum 60 cycles, a phase difference will exist between the pulses at the output of divider 8 and the reference signal. Accordingly, the instantaneous value of the signal is at some value other than zero when the pulses impressed on the base T1 gate the transistor. After a number of cycles of the reference signal, the capacitor C1 acquires a more positive charge if the phase difference is such that the gating pulse appears during the positive half cycles of the reference signal, which condition exists when the reference signal falls below 60 cycles. Similarly, the capacitor is discharged to a less positive level when the transistor T1 is gated during negative half cycles of the reference signal, which condition exists when the reference signal frequency rises above 60 cycles. In this manner, an error voltage is developed across the capacitor C1 which varies the frequency of the oscillator 1 to correspond to the change in the reference signal frequency.

In the circuit of FIGURE 2, it is desirable that the gain of the feedback loop comprising the divider 8 and the phase detector 11 should be smaller for small phase differences than for larger phase differences which present long-term frequency changes of the reference signal. To achieve the desirable gain characteristics in accordance with this invention, a nonsinusoidal reference signal is applied to line 12, thereby rendering the system less sensitive to short-term phase and frequency disturbances which inherently are present on the power line.

Figure 3:
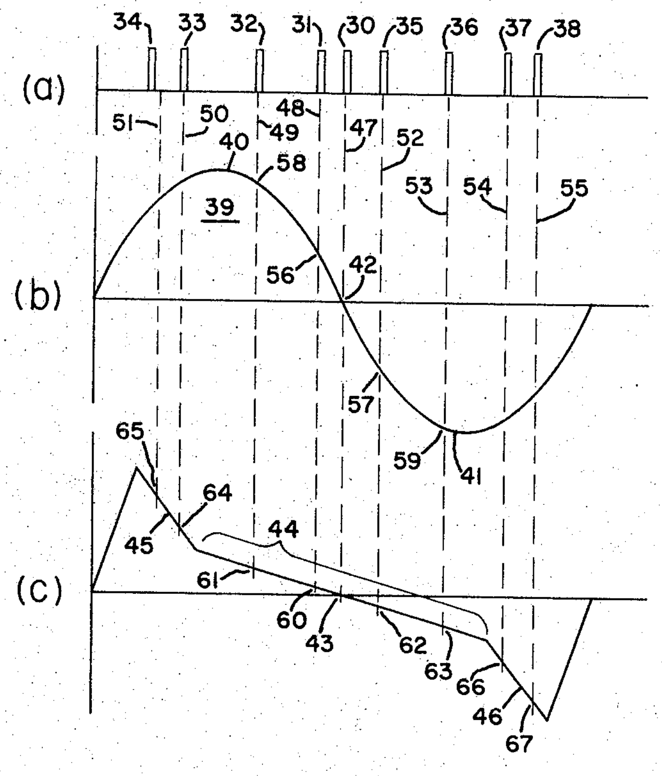
FIGURE 3 is a comparison of a sinusoidal reference wave and the nonsinusoidal wave employed in the system of the present invention.

Referring to FIGURE 3, there is shown the interrelationship of pulses from the divider 8 with respect to a sinusoidal reference wave and the nonsinusoidal wave employed in the system of the present invention. FIGURE 3(*a*) depicts pulses 30 through 38 at the output of the divider 8, the position of each pulse corresponding to a distinct phase difference with respect to the reference signal.

FIGURE 3(*b*) depicts a sinusoidal reference wave generally shown at 39 having a positive half cycle 40 and a negative half cycle 41, the wave passing through zero, or more precisely, the point of half wave symmetry at 42.

In FIGURE 3(*c*), there is shown the nonsinusoidal reference wave employed in the system of the present invention, the wave exhibiting half wave symmetry about a point 43 corresponding to the point of half wave symmetry 42 of the sinusoidal wave in FIGURE 3(*b*). The wave of FIGURE 3(*c*) presents a relatively small slope portion 44 in the region proximate to the point of symmetry 43 while having larger slope portions 45 and 46 in the regions further removed from the point of symmetry 43.

If it is assumed that the oscillator 1 is initially locked to the reference signal frequency, the pulse 30 will appear at the output of the divider 8. As shown by the dotted line 47 this pulse occurs at the points of half wave symmetry 42 and 43 of the waves in FIGURES 3(*b*) and 3(*c*), respectively. Should the frequency of the reference signal decrease, a phase difference will result between the output of the pulses from the divider 8 and the reference signal. As the reference signal frequency decreases, pulses 31, 32, 33 and 34 will result, in turn, these pulses bearing a phase relationship to the sinusoidal and nonsinusoidal reference waves as indicated by the dotted lines 48, 49, 50 and 51, respectively. Similarly, should the frequency of the reference signal increase pulses 35, 36, 37 and 38 will result for varying degrees of frequency increase, the pulses 35, 36, 37 and 38 bearing a phase relationship to the sinusoidal and nonsinusoidal reference waves as indicated by the dotted lines 52, 53, 54 and 55, respectively.

With respect to the pulses 31 and 35, which correspond to a small decrease and increase, respectively, of the reference signal, it is seen that since the instantaneous amplitude of the reference wave defines the error voltage, an error voltage having a relative amplitude indicated at 56 for pulse 31 will result through the use of the sinusoidal wave form of FIGURE 3(*b*). Thus, it will be appreciated that the gain of the system is controlled primarily by the slope of the reference wave. Accordingly, for pulses 32 and 36 which correspond to large phase differences, the resultant error voltage has a relative amplitude indicated at 58 and 59, respectively.

It is seen that the slope of the sinusoidal wave 39 decreases and, thus, the gain of the system is decreased with respect to the gain defined by the large slope portion of the sinusoidal wave during which the pulses 31 and 35 occur. This is exactly the opposite of the condition which should prevail since the gain of the system should be small in regions near the "locked-in" condition to render the system insensitive to spurious frequency and phase disturbances which occur in the reference signal, whereas the gain should be increased at phase differences further removed from the "locked-in" condition to insure maximum control over long-term frequency changes. The decreasing slope portions of the sinusoidal wave defines the usable range of the wave as a reference signal. Thus, when the wave passes through its maximum and minimum, the slope and, thus, the gain is zero. Accordingly, effective operation cannot be realized for phase differences greater than that represented by points 58 and 59, thus excluding phase differences corresponding to pulses 33, 34, 37 and 38.

The nonsinusoidal reference wave of FIGURE 3(c) employed in the system of the present invention provides optimum gain conditions by providing a reduced slope portion 44 in the region proximate to the point of symmetry 43 and increased slope portions 45 and 46 in the regions further removed from the point of symmetry 43. Through the use of such a signal, smaller error signals will result in conjunction with the pulses 31, 32, 35 and 36 as indicated at 60, 61, 62 and 63, respectively. The system exhibits a reduced gain in this region and is nonsensitive to short-term frequency changes in this region and the system is nonsensitive to short-term frequency and phase changes of the reference signal.

Should the frequency difference be such that pulses 33, 34, 35 and 36 occur, it is seen that the instantaneous amplitude of the nonsinusoidal reference wave will be large as indicated by dotted lines 50, 51, 54 and 55, respectively, since the pulses now fall at the increased slope portions 45 and 46, respectively, of the wave. In such an instance, an error signal indicated at 64, 65, 66 and 67 for pulses 33, 34, 37 and 38, respectively, will result. In this manner, the gain of the system is increased and an error signal which is a larger percentage of the phase difference will result for long-term frequency changes and optimum control over the oscillator 1 is effected. Accordingly, the increased slope portions 45 and 46 provide the desired high "pull-in" and high "hold-in" of the system.

Figure 4:
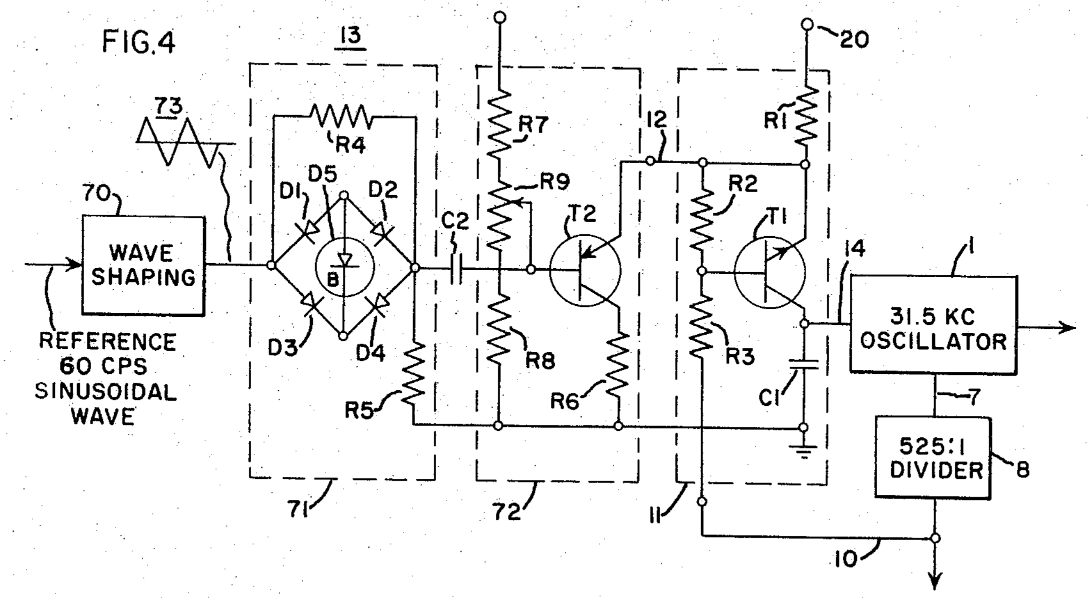
FIGURE 4 depicts a preferred embodiment of the invention.

Referring to FIGURE 4, there is shown a preferred embodiment of the system of the invention shown in FIGURES 1 and 2, like reference numerals being utilized for common elements. A sinusoidal 60 cycle signal, as derived for example from the power line, is applied to reference signal source 13 comprising wave shaping stage 70, slicer 71 and buffer stage 72. The output of wave shaping stage 70 is a sawtooth wave 73 as shown. The sawtooth output from the wave shaping stage 70 is applied to balanced slicer 71 comprising a diode bridge including diodes $D_1$–$D_4$, having a resistance R4 connected in shunt therewith. A breakdown diode $D_5$ is connected in the center leg of the bridge to provide the desired operation.

The diode bridge serves to "slice" a portion out of the sawtooth wave 73 to provide the nonsinusoidal reference wave shown in FIGURE 3(*c*), the resistance R4 controlling the slope of the reference wave in the reduced slope region of the wave. The nonsinusoidal reference wave developed by the balanced slicer 71 is coupled through capacitor C2 to the base of transistor T2; a voltage divider comprising resistance R7 and R8 and potentiometer R9 being connected between a suitable supply (not shown) and ground to provide a variable operating point for transistor T2 to, thereby, provide a zero setting for the error signal applied to oscillator 1. The emitter of transistor T2 is coupled via the line 12 to phase detector 11 as shown in FIGURE 2. The output of phase detector 11 controls the frequency of oscillator 1 in accordance with the phase difference between the reference signal and the output of divider 8 as previously discussed.

The operation of balanced slicer 71 can most easily be appreciated by initially considering that sawtooth wave 73 at the output of wave shaping stage 70 is at the highest point of the positive portion of the sawtooth wave. At this point the voltage across breakdown diode $D_5$ is above the breakdown voltage and the diode $D_5$ is essentially a short circuit. Current flows through diodes $D_3$, $D_5$ and $D_2$ and resistances R5 to ground and essentially the entire voltage at the output of wave shaping stage 70 appears across resistance R5, the voltage decreasing with the sawtooth wave. When the voltage is below the breakdown voltage of breakdown diode $D_5$, the diode presents a high impedance and current flow is essentially through resistances R4 and R5 to ground. Thus, a smaller portion of the voltage at the output of wave shaping stage 70 appears across resistance R5 and the output of balanced slicer 71 exhibits a reduced slope portion in this region corresponding to the positive segment of the reduced slope portion 44 of the wave shown in FIGURE 3(*c*).

Similarly, during the negative half cycle of the sawtooth wave current flows from ground through resistance R5, diode $D_4$, breakdown diode $D_5$ and diode $D_1$ when breakdown diode $D_5$ is conducting. Essentially, the entire voltage at the output of wave shaping stage 70 appears across resistance R5. When the voltage is below the breakdown voltage of breakdown diode $D_5$, current flow is through resistances R5 and R4 and a smaller portion of the voltage appears across resistance R5. Thus, the output of balanced slicer 71 exhibits a reduced slope portion corresponding to the negative segment of the reduced slope portion of the wave shown in FIGURE 3(*c*).

In this manner, a wave shaped in accordance with the present invention is produced whereby the gain of the frequency locking system is reduced in the region proximate to the "locked-in" condition and is increased in regions further removed from the "locked-in" condition.

Although the invention has been described with respect to certain specific embodiments, it will be appreciated that modifications and changes may be made by those skilled in the art without departing from the spirit and scope of the invention. For example, various other phase detector means or means for realizing the desired wave shape might be utilized.

What is claimed is:

1. A system for locking an oscillator to a reference frequency, said system comprising;

(a) phase detector means connected to said oscillator to apply a control signal thereto to lock said oscillator to said reference frequency, (b) means for applying a nonsinusoidal wave at said reference frequency to said phase detector means, said nonsinusoidal wave being substantially half wave symmetrical and each cycle of said nonsinusoidal wave having a relatively small slope portion in the region proximate to the point of symmetry of said cycle and having larger slope portions in the regions further removed from said point of symmetry, and (c) means for applying a portion of the output of said oscillator to said phase detector means, (d) whereby said phase detector develops a control signal proportional to the phase difference between said oscillator output and said nonsinusoidal wave, said control signal being a smaller percentage of said phase difference when said phase difference is within the limits defined by said decreased slope region of each cycle of said nonsinusoidal wave than when said phase difference is without said limits.

2. A system for locking an oscillator of a television synchronizing pulse generator to a sine wave reference signal source, said system comprising;

(a) phase detector means connected to said oscillator to apply a control signal thereto to lock said oscillator to the reference signal, (b) wave shaping means connected to said reference signal source to convert said sine wave into a modified reference signal comprising a nonsinusoidal wave exhibiting half wave symmetry, each cycle of said nonsinusoidal wave having a relatively small slope portion in the region proximate to the point of symmetry of said cycle and having larger slope portion in the regions further removed from said point of symmetry, (c) means for applying said modified reference signal to said phase detector, and (d) means for applying a portion of the output of said oscillator to said phase detector to compare said oscillator output with said modified reference signal to develop a control signal proportional to the phase difference between said oscillator output and said modified reference signal.

3. The system defined in claim 2 wherein said phase detector means comprises:

(a) switching means connected to said modified reference signal, and (b) capacitor means connected to said switching means, (c) said switching means being keyed by said oscillator output to charge said capacitor means to a level defined by the level of said modified reference signal during said keying, (d) the level of charge of said capacitor controlling the frequency of oscillation of said oscillator to lock said oscillator to said reference signal.

4. The system defined in claim 3 wherein said switching means comprises a transistor having its collector electrode connected to said capacitor means and having its base and emitter electrodes connected to said oscillator output and said modified reference signal, respectively.

5. A system for locking the oscillator of a television synchronizing pulse generator to a sine wave reference signal source, said system comprising;

(a) a phase detector having first and second inputs and having an output connected to said oscillator to apply a control signal thereto, (b) wave shaping means connected to said reference signal source for converting the sine wave reference signal into half wave symmetrical sawtooth wave of substantially identical frequency and phase, (c) means for decreasing the slope of each cycle of said sawtooth wave in the region proximate to the point of half wave symmetry to provide a modified reference signal, (d) means for applying said modified reference signal to the first input of said phase detector, and (e) means for applying a portion of the output of said oscillator to the second input of said phase detector, (f) whereby a control signal proportional to the phase difference between said oscillator output and said modified reference signal is produced at the output of said phase detector, said control signal being a smaller percentage of said phase difference when said phase difference is within the limits defined by said decreased slope region of each cycle of said modified reference wave than when said phase difference is without said limits.

6. A system for locking the oscillator of a television synchronizing pulse generator to a sine wave reference signal source, said system comprising;

(a) wave shaping means connected to said reference signal source for converting the sine wave reference signal into half wave symmetrical sawtooth wave of substantially identical frequency and phase, (b) wave slicing means for decreasing the slope of each cycle of said sawtooth wave in the region proximate to the point of half wave symmetry to provide a modified reference signal, (c) means for comparing said modified reference signal and said oscillator output to develop a control signal proportional to the phase difference between said modified reference signal and said oscillator output, (d) means for applying said control signal to said oscillator to lock the frequency of said oscillator to said reference signal, (e) said control signal being a smaller percentage of said phase difference when said phase difference falls within limits defined by the decreased slope portion of said modified reference signal than when said phase difference is without said limits.

7. The system defined in claim 6 wherein said wave slicing means comprises;

(a) a diode bridge connected between said first wave shaping means and said phase detector, (b) said bridge including a voltage controlled breakdown device in the center leg thereof, and (c) resistive means connected in shunt with said bridge to define the slope of said decreased slope portion of said modified reference wave.

8. The system defined in claim 6 wherein said wave slicing means comprises;

(a) a diode bridge comprising first and second legs connected between said first wave shaping means and said phase detector, (b) each leg having first and second inversely poled, serially connected diodes, (c) a breakdown diode connected from the junction between said first and second diodes of said first leg to the junction between said first and second diodes of said second leg, and (d) a resistance connected in shunt with said diode bridge.

No reference cited.

JOHN W. CALDWELL, *Acting Primary Examiner.*

R. L. RICHARDSON, *Assistant Examiner.*